R. M. JONES.
MOLDING APPARATUS.
APPLICATION FILED MAR. 24, 1920.

1,408,515.

Patented Mar. 7, 1922.
6 SHEETS—SHEET 1.

INVENTOR
Robert M. Jones
BY
J. W. McEllis
ATTORNEY

R. M. JONES.
MOLDING APPARATUS.
APPLICATION FILED MAR. 24, 1920.

1,408,515.

Patented Mar. 7, 1922.
6 SHEETS—SHEET 3.

INVENTOR
Robert M. Jones
BY J. W. Ellis
ATTORNEY

R. M. JONES.
MOLDING APPARATUS.
APPLICATION FILED MAR. 24, 1920.

1,408,515.

Patented Mar. 7, 1922.
6 SHEETS—SHEET 6.

UNITED STATES PATENT OFFICE.

ROBERT M. JONES, OF NIAGARA FALLS, NEW YORK.

MOLDING APPARATUS.

1,408,515. Specification of Letters Patent. Patented Mar. 7, 1922.

Application filed March 24, 1920. Serial No. 368,319.

*To all whom it may concern:*

Be it known that I, ROBERT M. JONES, a citizen of the United States of America, residing in the city of Niagara Falls, county of Niagara, and State of New York, have invented a certain new and useful Molding Apparatus, of which the following is a full, clear, and exact description.

My invention relates generally to molding and more particularly to the molding of cement blocks or bricks.

One of the principal objects of my invention has been to provide a device by which blocks or bricks may be easily, quickly and conveniently molded.

Another object has been to provide a device, the parts of which may be quickly interchanged, so that either cement blocks or cement bricks may be molded with the same apparatus.

A further object has been to provide a device whereby stucco blocks or bricks may be molded.

Furthermore, by means of my device either running blocks and bricks may be molded, or end blocks and bricks, with but few changes in the apparatus.

Moreover, my apparatus is very economical in its operation and blocks and bricks may be molded with a greatly decreased expenditure of time and labor.

The above objects and advantages have been accomplished by the device shown in the accompanying drawings. In the drawings.

I will now particularly describe the parts of my invention which are used in the formation of running blocks and refer more especially to Figs. 1 to 14, inclusive, 16, 17, 19 and 20.

36 is the base of my device which is supported upon suitable standards 37. At the front of the base is secured the molding flask 38 of my device. This flask is composed of a front wall 39, a rear wall 40, and end walls 41, which are fastened together by any suitable means. The flask shown in the above mentioned figures is for making two blocks and it is, therefore, provided with a center board 50 (Fig. 19) secured in position by integral lugs 51 and 52, which engage with a recess and aperture in the front wall 39 and rear wall 40, respectively. Near the bottom of each of the walls 39 and 40, is formed a groove 70 (see Figs. 10 and 14) for the sliding engagement of the pallet-form.

Extending outwardly and preferably to the right of the base 36, are two tracks 42, which are supported by suitable standards 43. These tracks are substantially twice the length of the molding flask and are provided with suitable rollers (not shown) upon which the pallet-form is arranged to move. Arranged under the tracks, preferably between the standards 43, is a bin 44 for holding the stucco used in making bricks and blocks. Another bin 45, for holding water-proofing material, is arranged under the part of the tracks which lies between the inner standard 43 and the standard 37 of the machine. Attached to the rear track and immediately over the water-proofing bin 45, is pivotally mounted a water-proofing screen 46. This screen comprises a frame 47 having an inwardly extending flange 48 for engagement with the inside of the pallet-form and an outwardly extending flange 49. Arranged centrally of this form, is a U-shaped cross bar 53 for engagement with the center strip of the pallet-form, hereinafter described. A handle 54 is provided for the frame, and a screen 55, of any type but preferably of expanded metal, is stretched across the frame.

Figures 1, 2:
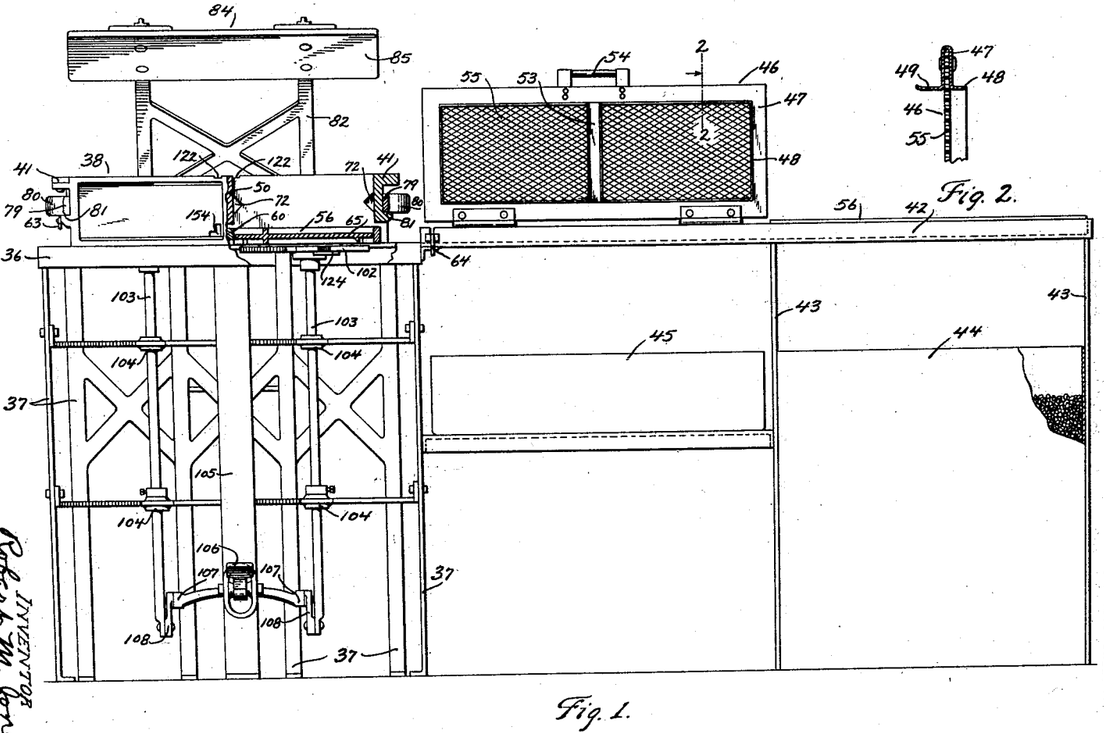
Fig. 1 is a front elevation of my complete apparatus with portions thereof in section.
Fig. 2 is an enlarged, fragmentary, sectional view of the water-proofing screen and is taken on line 2—2 of Fig. 1.
Figures 3, 4, 5, 6, 7:
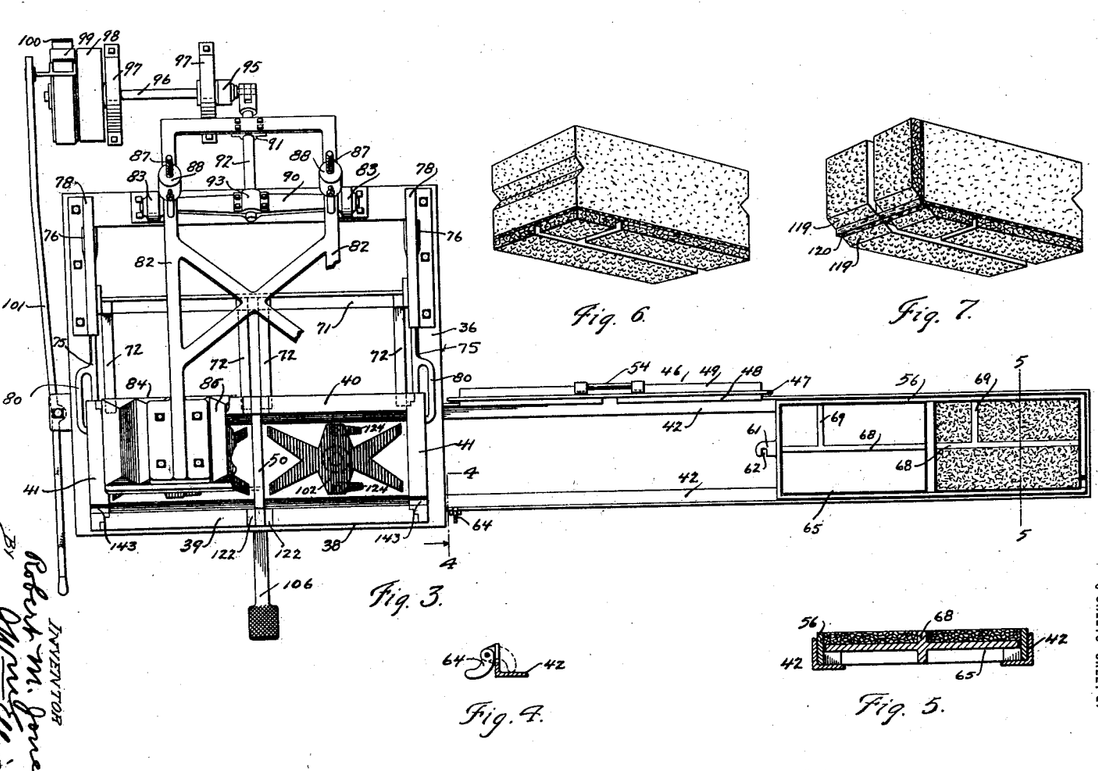
Fig. 3 is a plan view of the apparatus with portions thereof broken away.
Fig. 4 is an enlarged, sectional view showing the pallet-form locking means, and is taken on line 4—4 of Fig. 3.
Fig. 5 is an enlarged, sectional elevation of the pallet-form and pallet-board filled with stucco material, and is taken on line 5—5 of Fig. 3.
Fig. 6 is a perspective view of a finished running block.
Fig. 7 is a perspective view of a finished end block.
Figures 8, 9:
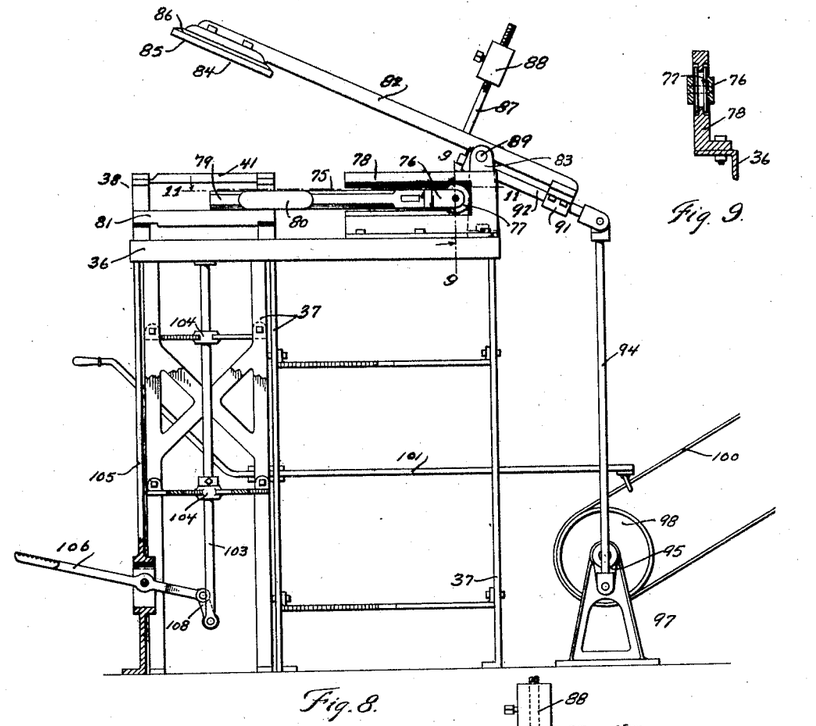
Fig. 8 is an elevation of the apparatus with a portion thereof in section.
Fig. 9 is an enlarged, sectional elevation of the frame guide and roller for the molding frame, and is taken on line 9—9 of Fig. 8.
Figure 10:
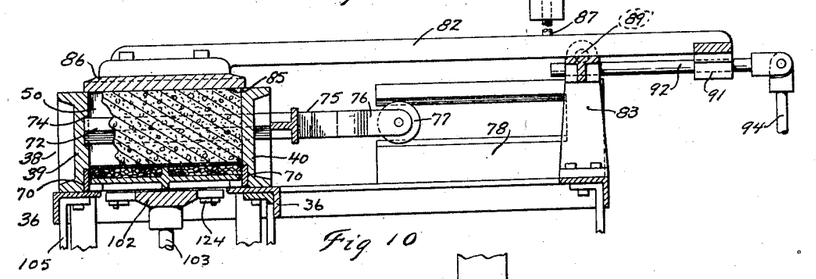
Fig. 10 is an enlarged, fragmentary, transverse sectional elevation of the apparatus, and is taken on line 10—10 of Fig. 12.
Figure 11:
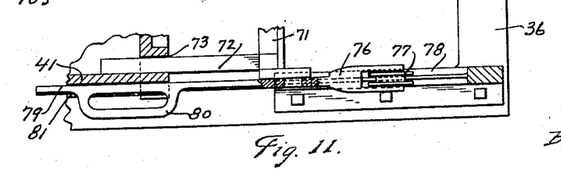
Fig. 11 is an enlarged, fragmentary, sectional, plan view, taken on line 11—11 of Fig. 8.
Figures 12, 13:
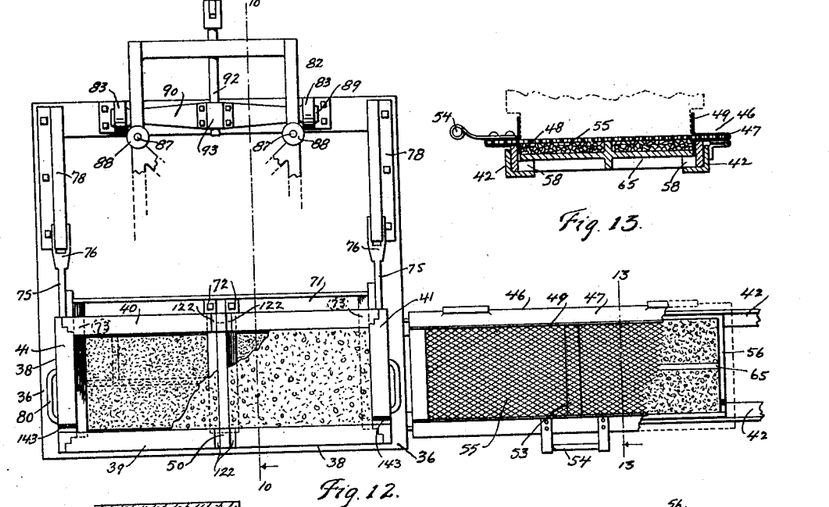
Fig. 12 is a fragmentary, plan view of the device showing a block being molded and the parts in their operative positions.
Fig. 13 is an enlarged, fragmentary, sectional view showing the water-proofing screen in position, and is taken on line 13—13 of Fig. 12.
Figure 15:
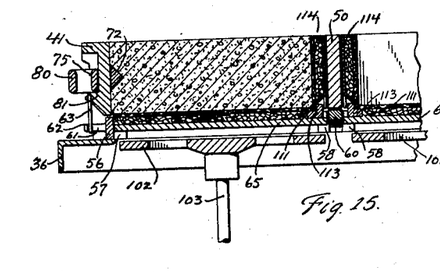
Fig. 15 is an enlarged, fragmentary, longitudinal, sectional view of the molding flask arranged for the making of corner blocks.
Figure 16:
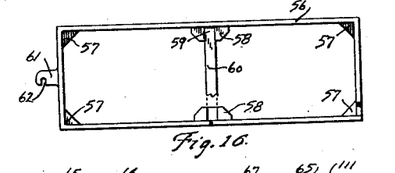
Fig. 16 is a plan view of the pallet-form.

The pallet-form 56, shown in Fig. 16, comprises a frame having lugs 57 at the corners, and lugs 58 at the center thereof. The lugs 58 are centrally recessed and arranged to engage the ends 59 of the center strip 60 (see Fig. 20). An outwardly extending lug 61 is provided at preferably the left hand side of the frame and is formed with a notch 62 with which the swinging latch 63 engages, (Figs. 1 and 15). This latch is pivotally secured to the left hand end wall 41 of the molding flask and serves to keep the pallet-form in its correct position while within the molding flask. A stop latch 64 is pivotally arranged at the inner end of one of the tracks 42, and when thrown into operative position will engage with the pallet-form and retain it in registering position with the water-proofing screen, (Figs. 1, 3 and 4).

Figures 17, 18, 19, 20:
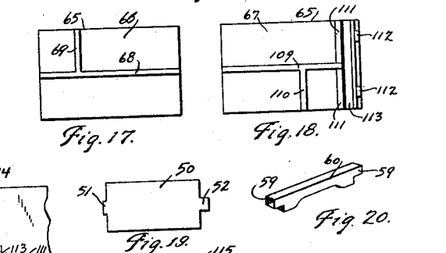
Fig. 17 is a plan view of the pallet-board, showing the side thereof which is used for molding running blocks.
Fig. 18 is a similar view of the pallet-board, showing the side thereof which is used for molding corner blocks.
Fig. 19 is a side view of the center board which is used for dividing the molding flask.
Fig. 20 is a perspective view of the center strip for dividing the pallet-form.

65 is the block-making pallet-board, which is provided with two working faces 66 and 67, as shown in Figs. 17 and 18, respectively. The working face 66 is for making running blocks and the face 67 is for making corner blocks, hereinafter described. The face 66 is provided with preferably one longitudinal ridge 68 and one lateral ridge 69 extending from the ridge 68 to the outside edge of the board. These ridges make grooves in the finished block, thus giving it the appearance of brick formation. When molding blocks, the pallet-form shown in Fig. 16, is provided with a center strip 60 and two pallet-boards are used, one being arranged on each side of the center strip.

Figure 14:
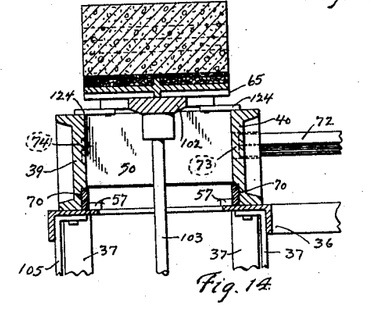
Fig. 14 is a fragmentary, transverse sectional view, taken through the molding flask of the apparatus, and shows a molded block ready to be removed.

Arranged on the base 36 and immediately behind the flask 38, is a molding frame 71, which is provided with a plurality of V-shaped arms 72. These arms are arranged, one at each end of the molding flask and one at each side of the center board 50, and are disposed so as to have the apex of the V facing the center of the block. The inner ends of these arms pass through the V-shaped apertures 73, provided in the rear wall 40 of the molding flask (Fig. 14). V-shaped recesses 74 are provided in the front wall 39 of the flask for the reception of the ends of the arms 72 when in their operative position. The molding frame 71 is carried by two frame slides 75, each of which is provided at its outer end 76 with a roller 77, engaged with a frame guide 78, secured to the base 36. The inner end 79 of each of these slides is provided with a handle 80 and is slidably supported by a flange 81, carried by each of the end walls 41. By means of these frame slides, the molding frame 71 may be easily and quickly moved forwardly and backwardly so as to bring the V-shaped arms 72 into and out of their operative positions.

A tamper arm 82 is pivotally arranged over the base 36 and is secured near its rear end to a rocker arm 90. This rocker arm is pivoted at points 89 within bearing standards 83 secured to the base 36. A tamper pad 84 is arranged at the forward end of the tamper arm and so positioned as to come in register with the top of the molding flask 38. This tamper pad is provided with a smooth surface 85, which is used when making blocks, and with a corrugated surface 86 (see Fig. 24) which is used when making bricks, hereinafter described. A number of counterbalance arms 87 are carried by the tamper arm 82 and arranged with their lower ends a slight distance in front of the pivotal point 89. An adjustable weight 88 is mounted on each of the arms 87, and is so arranged that it will be carried over to the other side of the pivotal points 89 when the tamper arm is in its vertical position, thereby counterbalancing the tamper pad and keeping the arm normally in the position shown in Figs. 1, 3 and 8. At the rear end of the tamper arm 82, is carried a block 91, in which one end of a tamper arm rod 92 is mounted. The inner end of this rod is mounted in a block 93, carried by the rocker arm 90; and the outer end thereof is bifurcated and pivotally connected with an operating rod 94. This operating rod is connected at its lower end with a crank 95, mounted to rotate with an operating shaft 96. The shaft 96 is mounted, preferably at the rear of the machine, within bearing standards 97. A tight and a loose pulley 98 and 99, respectively, are mounted upon the shaft 96 and engaged therewith is a belt 100, connected with any suitable source of power. A belt shifter 101 is arranged at any convenient place on the machine, where it will be within easy reach of the operator. The tamper arm 82 is operated by momentarily shifting the belt 100 from the loose pulley 99 to the tight pulley 98.

Arranged at each side of the center board of the molding flask and in register with each of the openings in the flask, is a pallet-spider 102. A latch 124 is arranged beneath each side of each of the spiders; and these latches are moved outwardly when the spiders are in their uppermost position, whereby the same will be locked in this position (Fig. 14). Each of these spiders is mounted at the upper end of a spider shaft 103, reciprocally mounted within bearings 104, carried by the frame work of the machine. A support 105 is arranged at the front of the machine and within it is pivotally mounted a treadle 106. The inner end of this treadle is provided with two arms 107, each of which is connected with one of the spider shafts 103, by means of a lever 108. When the pallet-form and palletboards are in position within the mold, and after the product has been molded, the pallet-boards may be lifted out of the mold by pressing down upon the outer end of the treadle 106.

Figure 21:
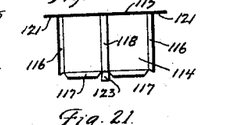
Fig. 21 is a face view of the end matrix used for making corner blocks.
Figures 22, 23:
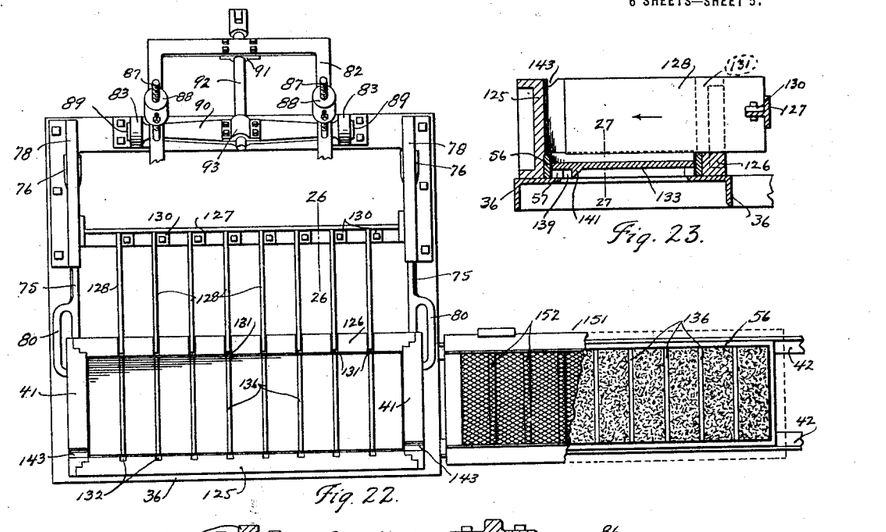
Fig. 22 is a plan view of the device arranged for making bricks.
Fig. 23 is a fragmentary, transverse, sectional view taken through the molding flask of Fig. 22, showing one of the movable partitions in an intermediate position.

I will now describe the apparatus used for making corner blocks referring especially to Figs. 15, 18 and 21.

When making corner blocks, the face 67 of each of the pallet-boards 65 is used. This face, like the opposite face, is provided with a longitudinal ridge 109 and a lateral ridge 110 extending from the longitudinal ridge to one outside edge of the board. The longitudinal ridge 109 is cut short at one end of the board and extending laterally from each side of this ridge is a triangularly-shaped strip 111 (Figs. 15 and 18). At the extreme edge of this end of the pallet-board are arranged preferably two blocks 112, thus forming a channel between the end of the pallet-board and the strips 111. Within this channel is arranged a corner matrix 113. This corner matrix is of an angle-iron cross-section and of such a thickness that the horizontally-arranged leg of the angle is of the same height as the triangular strips 111. An end matrix 114 (Fig. 21), forming the end face of each of the blocks, is placed on each side of the center board 50. This matrix is provided with a top flange 115, side flanges 116, and bottom flanges 117. A central rib 118 is also provided, which gives to the end face of the block, the appearance of a brick formation. The height of the flanges 115, 116 and 117 are substantially the same as the height of the ridges 109 and 110 of the pallet-board; and, when the matrix is in position the bottom flanges 117 will terminate at the inner face of the vertical leg of the corner matrix 113 (Fig. 15). Between the bottom flanges 117, is provided a tab 123, which is arranged behind the vertical leg of the corner matrix 113 when it is in position. The triangularly-shaped strips 111 are sloped downwardly from their tops, and the side and bottom flanges 116 and 117 are inclined outwardly. By this arrangement the edges 119 (see Fig. 7) of the stucco surface of the corner blocks will be tapered or chamfered, thus leaving a clean corner 120, which is formed by the corner matrix 113. The top flange 115 of this matrix is arranged at right angles to the bottom thereof, and its ends 121 extend beyond the side edges of the same. Grooves 122 are provided in the upper surface of the walls 39 and 40 of the molding flask and at each side of the center board for the reception of the ends 121 of the flange 115 (Figs.

1, 3 and 12). The relative positions of the end matrix 114, the corner matrix 113, and pallet-boards 65 are clearly shown in Fig. 15. When making corner blocks, the V-shaped arms 72 of the molding frame, which lie on each side of the center board, are removed from the frame, because the grooves formed thereby are not needed or desired on the end faces of corner blocks, and also to make room for the end matrices 114.

In Figs. 22 to 31, inclusive, I show my device arranged for making running and corner bricks. When the device is changed over from a block-making to a brick-making machine, the front and rear side walls 39 and 40, respectively, of the molding flask are removed, and are replaced by front and rear walls 125 and 126, respectively; and a molding frame 127 is secured to the frame slides 75 in place of the molding frame 71. The rear wall 126 of the molding flask is provided with a plurality of vertical slots 131, in which the forward ends of the movable partitions 128 are disposed. The front wall 125 of the molding flask is provided with a series of recesses 132, with which the forward ends of the movable partitions are engageable when the molding frame is moved to its forward position.

Figure 24:
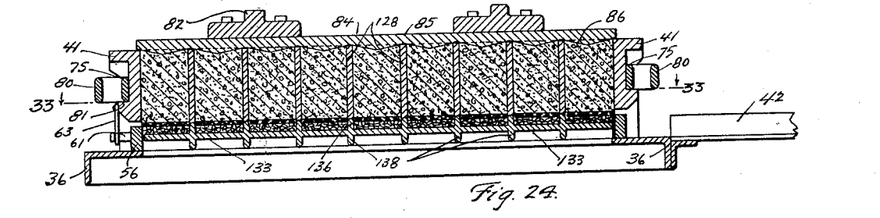
Fig. 24 is an enlarged, longitudinal, sectional view taken through the center line of the flask, showing molded bricks in the flask.
Figure 25:
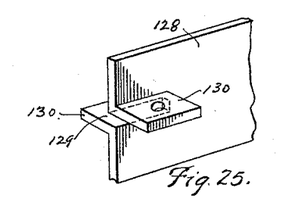
Fig. 25 is a fragmentary, perspective view of one of the movable partitions of the brick making machine.
Figure 26:
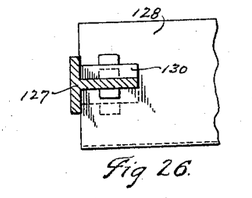
Fig. 26 is an enlarged, fragmentary, sectional view taken on line 26—26 of Fig. 22, and shows the manner of connecting the movable partitions with the molding frame.
Figures 27, 28, 34, 35:
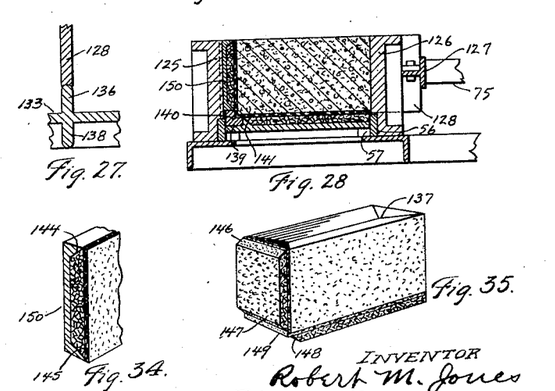
Fig. 27 is an enlarged, fragmentary, sectional elevation of one of the movable partitions and the pallet-board, and is taken on line 27—27 of Fig. 23.
Fig. 28 is an enlarged, transverse, sectional elevation taken through the molding flask, showing the parts in position for molding corner bricks.
Fig. 34 is an enlarged, fragmentary, perspective, sectional view of the multiplex end matrix, filled with material and ready for use.
Fig. 35 is a perspective view of a finished corner brick.
Figure 29:
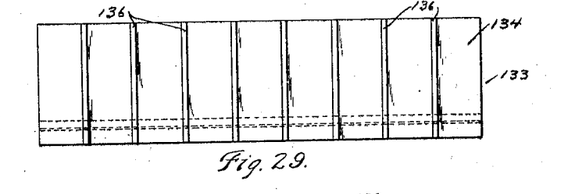
Fig. 29 is a plan view of one side of the brick pallet-board.
Figure 30:
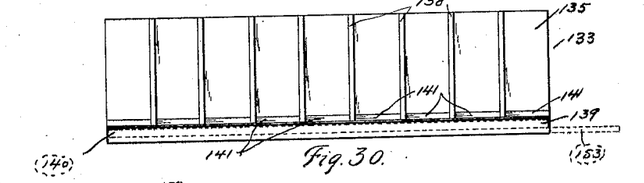
Fig. 30 is a plan view of the reverse side of the brick pallet-board.

When molding bricks, the center strip 60 is removed from the pallet-form 56 and a pallet-board 133 (Figs. 29 and 30,) extending the full length of the pallet-form is used. This pallet-board, like the one used for blocks, is provided with two working surfaces 134 and 135. The surface 135 is for making corner bricks, to be hereinafter described, and the surface 134 is for making running bricks. On the surface 134 are a plurality of ridges 136 corresponding in number to the movable partitions 128. The upper edges of these ridges are preferably rounded as shown in Fig. 27, for engagement with the grooved lower edges of the movable partitions 128, which register with the ridges when the pallet-form is moved to its proper position within the molding flask. The water-proofing screen 151 used for making bricks is very similar to the screen 46, except that it has a number of U-shaped partitions 152, equal in number to the number of ridges 136 on the pallet-board 133. When molding bricks, the tamper pad 84 is attached to the tamper arm 82 so that its corrugated face 86 will be in operative position. As shown in Fig. 24, each one of the corrugations provided on the face 86 of the pad will register with one of the brick spaces of the mold, whereby the material will be compressed somewhat and forced toward the edges thereof, thus forming a recess 137 in the back of each of the bricks, as shown in Fig. 35.

Figure 31:
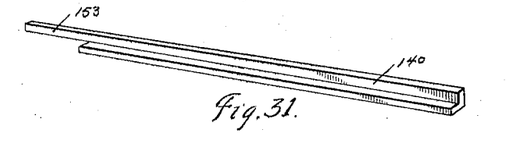
Fig. 31 is a perspective view of the corner matrix for the brick pallet-board.
Figure 32:
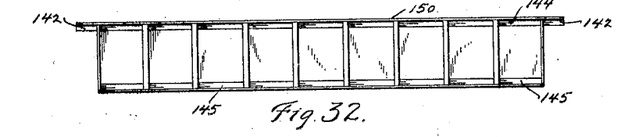
Fig. 32 is a face view of the multiplex end matrix for the corner bricks.
Figure 33:
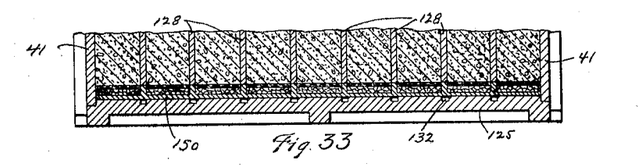
Fig. 33 is a fragmentary, plan, sectional view, taken on line 33—33 of Fig. 24, showing the multiplex end matrix in position.

When molding corner bricks, the surface 135 of the pallet-board 133 is used. The lateral ridges 138 thereof terminate a short distance back from one edge of the board, thus leaving a clear longitudinal channel 139 (Figs. 23 and 28) for the reception of the corner matrix 140 (Fig. 31). Bounding the channel on one side, and arranged between the ridges 138, are a plurality of triangularly-shaped strips 141, the upper surfaces of which slope from the upper edges thereof backwardly to the surface 135 of the board. In Fig. 32 is shown the face view of the multiplex end matrix 150, used when making corner bricks. In Fig. 33 this matrix is shown in use; and in Fig. 34 a sectional view of this matrix is shown filled with stucco and water-proofing material. This matrix is provided at each end with an outwardly extending arm 142, which engages with a notch or recess 143 formed in the upper edge of each of the end walls 41 of the flask, and adjacent to the inner surface of the front wall 125 thereof. The top walls 144 and bottom walls 145 of the matrix are each inclined so as to form the chamfered surfaces 146 and 147, respectively of the brick (Fig. 35). The chamfered surface 148 of each brick is formed by the inclined face of one of the triangular strips 141 of the pallet-board. The corner edge 149 of each of the bricks is formed by the corner matrix 140, which, like the corner matrix 114, hereinbefore described, is of angle-iron cross-section.

When my device is to be used, for instance, for making running blocks, like that shown in Fig. 6, a pallet-form 56 is placed upon the tracks 42 immediately over the stucco bin 44. The center strip 60 having been placed in position in the form, a pallet-board 65 is placed within the form at each side of the center strip and with its surface 66 on top. Stucco is taken from the bin 44 and placed within the form and on top of each of the pallet-boards so as to substantially fill the boards up to the top of the ridges 68 and 69. The pallet-form is now moved along on the tracks until it comes in contact with the stop 64, which has been previously set, whereupon the pallet-form will be in register with the water-proofing screen 46, when the same is lowered into position. When the water-proofing screen is lowered, the inner flanges 48 will engage with the inside edges of the form and the flanges of the U-shaped cross bar 53 will engage with each side of the center strip 60, thus leaving only the stucco on the pallet-boards exposed. Water-proofing material is now taken from the bin 45 and placed upon the top of the screen 55, after which a trowel, preferably shaped to fit in between the flanges 49 of the screen—similar to that shown in dotted lines in Fig. 13—is passed over the top of the screen, thereby pressing the water-proofing material therethrough and upon and into the stucco. When an even layer of water-proofing material has thus been applied to each of the pallet-boards, the screen is raised and the stop 64 moved out of the way, whereupon the pallet-form, with the stucco and water-proofing material, is moved on into the molding flask 38. The form is moved into the mold to a position where the latch 63 can be engaged with the notch 62 of the lug 61 carried by the form. The molding frame 71 is now operated so as to draw the V-shaped arm 72 thereof into the molding flask. Cement mixture, which is to form the body of the block, is now placed, in proper amounts, within the molding flask on each side of the center board; and the belt shifter 101 is then moved, thus operating the tamper arm 82 and bringing the tamper pad 84 down upon the cement mixture in the molds, thereby forcing the cement into the mold. The shaft 96 is operated preferably through one revolution so that, after the tamper pad has reached its predetermined position and has pressed the cement into the mold, it is immediately moved back to the position shown in Figs. 1, 2 and 8. The treadle 106 is now pushed downwardly by the operator, whereby the spiders 102 are raised upwardly to the position shown in Fig. 14. When in this position the latches 124 are turned outwardly, whereby these spiders will rest upon the upper face of the molding flask. Each of the pallet-boards with the finished block thereon, is now removed from the spider and is placed aside to cure.

When molding corner blocks, such as the one shown in Fig. 7, the surface 67 of each of the pallet-boards 65 is used. A corner matrix 113 is placed within the channel at the end of each of the boards, before they are placed in the form, after which they are filled with stucco and water-proofing material, as above described. Before molding the corner blocks, the arms 72 lying at each side of the center board 50 are removed; and, after the molding form has been moved within the molding flask, an end matrix 114, previously filled with stucco and water-proofing material, is placed within the mold at each side of the center board 50. The cement forming the body of the blocks is now placed within the flask and tamped in the same manner as above described. The pallet-boards and finished blocks are lifted out of the molds by the spiders in the same manner as hereinbefore described, but before the treadle is operated the corner matrices 140 are pushed out through the openings 154 provided in the sides of the flask.

When the device is to be used for making bricks, the flask walls 125 and 126 are substituted for the walls 39 and 40, and the molding frame 127 is substituted for the molding frame 71. The center strip 60 is removed from the pallet-form and the surface 134 of the pallet-board 133 is used, when making running bricks. The operation of the machine when making running bricks is the same as that hereinbefore described for making running blocks.

When making corner bricks the surface 135 of the pallet-board is used; and after the corner matrix 140 has been placed in position on the pallet-board (as shown in dotted lines in Fig. 30), and the board filled with stucco and water-proofing material, the pallet-form is moved into the molding flask. The multiplex end matrix 150, which has previously been filled with stucco and water-proofing material, is now placed within the flask adjacent the inner face of the front wall 125, whereupon the body of the block is molded and removed from the flask in the same manner as hereinbefore described. However, before raising the finished bricks from the mold, the corner matrix 140 is withdrawn at the end of the flask, by means of the handle 153.

While I have described the use of but one pallet-form, it is my intention to have a number of them, so that while one is in the molding flask, two others may be upon the track—one being filled with stucco and the other with water-proofing material, by which arrangement I am able to greatly increase the output of my machine.

In the drawings, I have shown each of the pallet-boards as being formed with two working surfaces, but it is obvious that pallet-boards may be provided, each with only one working surface of the desired form. These and other modifications of the details herein shown and described may be made without departing from the spirit of my invention or the scope of the appended claims and I do not, therefore, wish to be limited to the exact embodiment herein shown and described.

Having thus described my invention, what I claim is:

1. A molding apparatus comprising a base, a molding flask supported by the base, longitudinal tracks at one side of the base, a pallet-form carried by the tracks and engageable with the molding flask, and a pallet-board carried by the pallet-form.

2. A molding apparatus comprising a base, a molding flask supported by the base, longitudinal tracks at one side of the base, a pallet-form carried by the tracks and engageable with the molding flask, a pallet-board carried by the pallet-form, and a water-proofing screen mounted on one of the tracks and engageable with the pallet-form.

3. A molding apparatus comprising a base, a molding flask, supported by the base, longitudinal tracks at one side of the base, a pallet-form carried by the tracks and engageable with the molding flask, a pallet-board carried by the pallet-form, a waterproofing screen mounted on one of the tracks and engageable with the pallet-form, and means for retaining the pallet-form in registering position upon the tracks.

4. A molding apparatus comprising a base, a molding flask supported by the base, longitudinal tracks at one side of the base, a pallet-form carried by the tracks and engageable with the molding flask, and a pallet-board carried by the pallet-form and provided with a longitudinal ridge and a lateral ridge, whereby grooves may be made on the finished block, giving it the appearance of brick formation.

5. A molding apparatus comprising a base, a molding flask supported by the base, a pallet-form arranged within the molding flask, a pallet-board carried by the pallet-form, and a molding frame arranged adjacent to the molding flask and engageable therewith.

6. A molding apparatus comprising a base, a molding flask supported by the base, frame guides secured to the base, a molding frame slidably carried by the guides, comprising a plurality of V-shaped arms engageable with recesses and apertures formed in the molding flask, and means for operating the molding frame.

7. A molding apparatus comprising a base, a molding flask supported by the base, a pallet-form arranged within the molding flask, a pallet-board carried by the pallet-form, and a slidable molding frame arranged adjacent the molding flask, and comprising a plurality of V-shaped arms engageable with apertures and recesses formed in the molding flask.

8. A molding apparatus comprising a base, a molding flask supported by the base, frame guides secured to the base, a frame slide arranged at each end of the flask and having one end slidably mounted within the frame guide, and the other end slidably supported by the end of the flask, and a molding frame secured to the guides comprising a plurality of V-shaped arms engageable with the apertures and recesses formed in the molding flask.

9. A molding apparatus comprising a base, a molding flask supported by the base, a pallet-form arranged within the molding flask, a pallet-board carried by the pallet-form, a molding frame arranged adjacent to the molding flask and engageable therewith, a tamper arm pivotally arranged over the base, a tamper pad carried by the arm and registrable with the molding flask, and means for operating the tamper arm.

10. A molding apparatus comprising a base, a molding flask supported by the base, a pallet-form arranged within the molding flask, a pallet-board carried by the pallet-form, a pallet-spider arranged below and in register with the flask, and means for vertically operating the pallet-spider.

11. A molding apparatus comprising a base, a molding flask supported by the base, a pallet-form arranged within the molding flask, a pallet-board carried by the pallet-form, a pallet-spider arranged below and in register with the flask, and means for locking the pallet-spider in its uppermost position.

12. A molding apparatus comprising a base, a molding flask supported by the base, longitudinal tracks at one side of the base, a pallet-form carried by the tracks and engageable with the molding flask, a pallet-board carried by the pallet-form, a pallet-spider arranged below and in register with the flask, and means for vertically operating the pallet-spider.

13. A molding apparatus comprising a base, a molding flask supported by the base, longitudinal tracks at one side of the base, a pallet-form carried by the tracks and engageable with the molding flask, a pallet-board carried by the pallet-form, a pallet-spider arranged below and in register with the flask, means for vertically operating the pallet-spider, and a water-proofing screen mounted on one of the tracks and engageable with the pallet-form.

14. A molding apparatus comprising a base, a molding flask supported by the base, a vertical center board mounted within the flask, a pallet-form arranged within the flask and provided with a center strip, and pallet-boards carried by the pallet-form and mounted one on each side of the center strip.

15. A molding apparatus comprising a base, a molding flask supported by the base, a vertical center board mounted within the flask, a pallet-form arranged within the flask and provided with a center strip, pallet-boards carried by the pallet-form and mounted one on each side of the center strip, a vertically movable pallet-spider arranged to register with each of the openings at each side of the center board of the flask, and means for operating the pallet-spiders.

16. A molding apparatus comprising a base, a molding flask supported by the base, a vertical center board mounted within the flask, a pallet-form arranged within the flask and provided with a center strip, pallet-boards carried by the pallet-form and mounted one on each side of the center strip, each of the pallet-boards being provided with a lateral strip near one end thereof, a corner matrix arranged adjacent the strip, and an end matrix disposed on each side of the center strip.

17. A molding apparatus comprising a base, a molding flask supported by the base, a vertical center board mounted within the flask, a pallet-form arranged within the flask and provided with a center strip, pallet-boards carried by the molding flask and mounted one on each side of the center strip, a slidably mounted molding frame arranged adjacent the molding flask, and comprising a plurality of V-shaped arms engageable with apertures and recesses formed in the molding flask.

18. A molding apparatus comprising a base, a molding flask supported by the base, a pallet-form arranged within the flask, a pallet-board carried by the pallet-form provided with a plurality of lateral ridges, the ends of the ridges at one side of the board terminating at some distance from the edge of the board, a plurality of longitudinally extending strips, arranged one between each of the terminated ends of the lateral strips, thereby forming a longitudinal channel, a corner matrix disposed within the channel and adjacent the longitudinally arranged strips, and a multiplex end matrix arranged adjacent the inner face of the front wall of the flask.

19. A molding apparatus comprising a base, a molding flask supported by the base, a pallet-board arranged within the molding flask, a molding frame arranged adjacent the molding flask and engageable therewith, a tamper arm pivotally arranged over the base, a tamper pad carried by the arm and registrable with the molding flask, and means for operating the tamper arm.

20. A molding apparatus comprising a base, a molding flask supported by the base, a pallet-board arranged within the molding flask, a pallet spider arranged below and in register with the flask, means for vertically operating the pallet spider, a molding frame arranged adjacent the molding flask, a tamper arm pivotally arranged over the base, a tamper pad carried by the arm and registrable with the molding flask, and means for operating the tamper arm.

21. A molding apparatus comprising a base, a molding flask supported by the base, a pallet-form arranged within the molding flask, a pallet-board carried by the pallet-form, a pallet-spider arranged below and in register with the flask, means for vertically operating the pallet-spider, frame guides secured to the base, a frame slide arranged at each end of the flask and having one end slidably mounted within the frame guide, and the other end slidably supported by the end of the flask, and a molding frame secured to the guides.

22. A molding apparatus comprising a base, a molding flask supported by the base, longitudinal tracks at one side of the base, a pallet-form carried by the tracks and engageable with the molding flask, a pallet-board carried by the pallet-form, a pallet-spider arranged below and in register with the flask, means for vertically operating the pallet-spider, a water-proofing screen mounted on one of the tracks and engageable with the pallet-form, frame guides secured to the base, a frame slide arranged at each end of the flask and having one end slidably mounted within the frame guide, and the other end slidably supported by the end of the flask, and a molding frame secured to the guides.

23. A molding apparatus comprising a base, a molding flask supported by the base, a vertical center board mounted within the flask, a pallet-form arranged within the flask and provided with a center strip, pallet-boards carried by the pallet-form and mounted one on each side of the center strip, and a slidable molding frame arranged adjacent the molding flask.

24. A molding apparatus comprising a base, a molding flask supported by the base, a vertical center board mounted within the flask, a pallet-form arranged within the flask and provided with a center strip, pallet-boards carried by the pallet-form and mounted one on each side of the center strip, a vertically movable pallet-spider arranged to register with each of the openings at each side of the center board of the flask, means for operating the pallet-spiders, and a slidable molding frame arranged adjacent the molding flask.

25. A molding apparatus comprising a base, a molding flask supported by the base, a vertical center board mounted within the flask, a pallet-form arranged within the flask and provided with a center strip, pallet-boards carried by the pallet-form and mounted one on each side of the center strip, each of the pallet-boards being provided with a lateral strip near one end thereof, a corner matrix arranged adjacent the strip, an end matrix disposed on each side of the center strip, and a slidable molding frame arranged adjacent the molding flask.

In testimony whereof, I have hereunto signed my name.

ROBERT M. JONES.